Sept. 1, 1942.  M. H. VEAZEY  2,294,523
PROCESS OF COLORING GRANULES
Filed Nov. 29, 1938
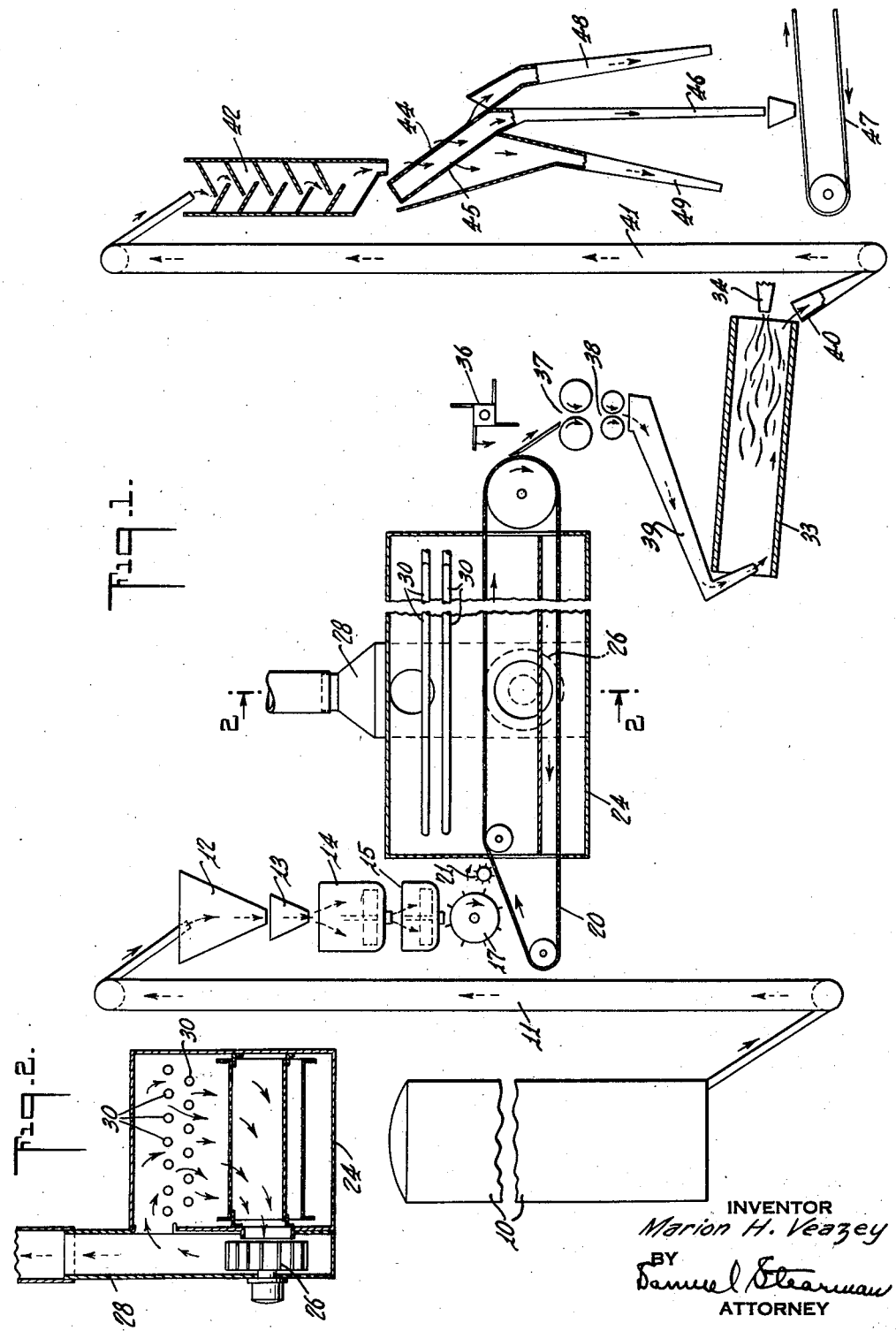
INVENTOR
Marion H. Veazey
BY
Samuel Stearman
ATTORNEY

UNITED STATES PATENT OFFICE 2,294,523

PROCESS OF COLORING GRANULES

Marion H. Veazey, Rutherford, N. J., assignor to The Patent and Licensing Corporation, New York, N. Y., a corporation of Massachusetts Application November 29, 1938, Serial No. 242,891

5 Claims. (Cl. 117—100)

This invention relates to improvements in the production of artificially colored granules and more particularly to improvements in the process of artificially coloring mineral granules for use in the surfacing of asphalt composition roofing and other materials for exposure to the weather. This application is a continuation-in-part of my co-pending applications Serial No. 737,774, filed July 31, 1934 (now Patent No. 2,142,540) and Serial No. 9,786, filed March 7, 1935.

The invention is more particularly concerned with improvements in the process of coloring granules wherein a soluble silicate such as sodium silicate is used as the binding agent to fix the coloring matter to the surface of the granules. The invention finds particular advantage in connection with known processes of coloring granules with the use of sodium silicate as the binding agent for the pigment, wherein the silicate is insolubilized by heat treatment at temperatures well below fusion temperatures and say of the order of 900° F. or less.

Where the heat treatment for drying and insolubilizing the coated granules is conducted under conditions causing relatively violent movement or agitation of the granules, as occurs for example when heating them in a rotary kiln, there is often a tendency for the coating to be abraded by the relatively violent agitation or tumbling movement of the granules. This abrasion occurs primarily during the time that the coating passes through a soft, gelled condition and before it has set sufficiently to resist the abrasive action induced by the movement of the granules relative to one another. Frequently, even if the abrading action is not sufficiently intense to strip the coating from the surface of the granules, it nevertheless results in loss of pigment and consequent loss of intensity of the colors of the finished granules, requiring the use of excessive amounts of pigment to compensate for that lost by abrasion during the processing.

Granules colored by these so-called silicate processes, especially when conducted at temperatures below 900° F., also exhibit a tendency to bloom, manifesting itself in the appearance of a white or opaque and more or less bulky deposit on the granules when they, or products covered therewith, are subjected in storage or use to certain conditions of temperature and humidity. In my prior applications Serial No. 737,774 and Serial No. 9,786, I have described and claimed methods involving the use of certain reactive substances in the coating of pigment and silicate applied to the granules, to inhibit the formation of bloom-producing constituents. Substances of this character usually act to hasten gelling of the silicate before substantial loss of water occurs and consequently when these substances are included in the film of the color coating applied to the granules, the tendency of the coating film to be abraded and stripped from the surface of the granules is particularly pronounced when they are subjected to heat treatment in apparatus in which the granules are relatively violently agitated during the transition stage between gellation and substantial dehydration. Apparently, it is during this transition stage that the film is especially tender and susceptible to abrasion by any substantial movement of the granules relative to one another, as when they are tumbled or agitated. Although this critical stage, while the gel is drying out, appears to be of relatively short duration, depending upon the temperature, it has not been possible heretofore in the practical operation of the process, to avoid substantial color loss by abrasion of the coating and frequent stripping of the film from the granules.

My present invention aims to provide a method of coloring granules with the use of a soluble silicate as the binding agent for the pigment and wherein the heat treatment for drying and insolubilizing the color coating is such as to eliminate the tendency of the film to be abraded or stripped from the surface of the granules.

Briefly stated, the invention involves the steps of mixing the sodium silicate and other ingredients of the color coating with the granules, conveying the freshly coated granules in a relatively quiescent state through a predrying zone where the coating film is gelled and predried to a set condition such that agitation of the granules in the subsequent steps of the process will not materially abrade the film from the surface of the granules, and finally retorting the granules to complete the insolubilization of the silicate. By the term "relatively quiescent state" I mean to include substantially no agitation of the granules as well as such minimum agitation as may be necessary to prevent agglomeration or clustering of the granules during the predrying stage.

In the accompanying drawing:

Fig. 1 is a diagrammatic view, showing partly in cross-section and partly in elevation, an arrangement of apparatus for practicing the invention; and Fig. 2 is a cross-section along line 2—2 of Fig. 1.

In the practice of the invention, the granules delivered from a storage supply 10 by means of an elevator or other conveyor 11 to a supply hopper 12 discharging to a weighing hopper 13 are first mixed in a mixer 14 with the required amount of pigment. Where trap rock constitutes the base granules, from 15 to 30 pounds of pigment per ton of granules may be employed, the amount varying according to the intensity of the color desired. Sodium silicate is then mixed with the pigment covered granules in the mixer 14. Where the commercial grade of sodium silicate known as "N" Brand, in which the weight ratio of $Na_2O$ to $SiO_2$ is 1:3.25, is employed, 100 to 150 pounds of the silicate per ton of granules will usually suffice. In lieu of mixing the granules separately with the pigment and the sodium silicate, the pigment may be suspended in the silicate and the granules then mixed with this suspension. The thus coated granules are then discharged to a secondary mixer or reservoir 15 from which they are deposited as by means of a feeding drum 17 upon a horizontal, continuously moving, endless screen or perforated belt 20 so as to form a relatively shallow bed thereon, a spreader 21 being arranged above the conveyor to spread the granules in a uniform bed. The conveyor is moved horizontally through a heating zone for predrying the coating on the granules. Preferably I employ an enclosed heating chamber 24 in which the granules are predried by means of heated air. For this purpose, the chamber has suction fans 26 connected to its side walls at a level below that of the travelling bed of granules, the arrangement being such as to cause a circulation of air, drawn from the atmosphere downwardly through the bed of granules on the perforated belt or screen conveyor, upwardly around the sides of the conveyor and then downwardly again through the bed, as indicated by the arrows in Fig. 2. Bleed off to the atmosphere may be provided through a flue or flues 28. The air circulated through the bed of granules may be heated to the desired temperature by passing it over steam coils or other heating elements 30 located preferably above the travelling bed of granules. The temperature of the circulating air is desirably controlled thermostatically to maintain a temperature in the heating chamber of the order of about 175–250° F. By thus moving the granules while coated with the wet film of silicate and pigment through a heating zone in a quiescent state, until the coating has been pregelled or predried to cause it to set sufficiently, abrasion of the film from the surface of the granules is avoided. Moreover, by thus predrying the granules in a heating zone wherein they are heated indirectly or in an atmosphere substantially free of carbon dioxide, I gain the further advantage of preventing absorption of carbon dioxide by the coating during its wet or ungelled state and thus minimize the tendency of the granules to bloom, as set forth in my aforesaid application Serial No. 737,774.

The predrying of the granules while moving them through the heating zone in a quiescent state without permitting substantial movement of the granules relative to one another is of particular advantage when the coating film includes substances functioning to inhibit the formation of bloom-producing constituents. Where such substances are employed they are preferably applied to the granules in the form of a dry powder before mixing the granules with the pigment and the silicate. The powdered reagent is mixed with the granules until uniformly distributed more or less as a dust on the surfaces of the granules. This order of mixing is preferable as it prevents localized reaction between the inhibiting reagent and the silicate in concentrated areas when the reagent is applied after the granules have been coated with the silicate.

The inhibiting reagent may comprise substances such as boric acid or calcium borate, in the proportion of about 1 to 3 pounds per ton of granules coated with silicate in the proportions stated above. Preferably, however, I employ as the inhibiting reagent a slightly soluble fluosilicate such as barium fluosilicate or sodium fluosilicate as described and claimed in my aforesaid co-pending application Serial No. 9,786. I find these materials particularly effective in preventing blooming of the finished granules by reason of the fact that they react with the silicate to produce reaction products none of which assume a bloom-forming condition. Where barium fluosilicate constitutes the inhibiting reagent, it may be used in proportions of about 10 to 30 pounds per ton of granules coated with sodium silicate in the proportions above stated. Where sodium fluosilicate is employed as the inhibiting reagent, about 5 to 20 pounds per ton of granules coated with sodium silicate in the above stated proportions will suffice.

The granules, after passing through the predrying stage in the heating chamber are delivered from the forward end of the screen or perforated belt conveyor 20 to the inlet end of a rotary kiln 33 of the ordinary direct fired type indicated by the burner 34. In transferring the granules from the discharge end of the preheating chamber to the inlet of the roasting kiln, they may be fed past a slowly moving paddle or breaker bar 36 and between pairs of disintegrating rolls 37, 38 arranged to break up cakes and disintegrate any clusters of granules that may have formed during the preheating stage, the granules being delivered to the inlet of the kiln as through a conduit 39. In their passage through the kiln, the temperature of the granules is raised to about 500 to 650° F. for effecting complete insolubilization of the silicate and permanent fixing of the color coating upon the surface of the granules.

The coated granules delivered from the discharge end of the roasting kiln as through a trough indicated at 40 may then be fed by means of an elevator or other conveyor 41 through a cooling tower 42 in the usual manner to lower their temperature to the extent necessary to prepare them for shipment or use, the cooled granules being screened at 44, 45. The granules of desired size are delivered through a spout 46 to a conveyor 47 which may lead to storage, while oversized or coarse granules discharge through spout 48 and undersized granules or fines discharge through spout 49.

I claim:

1. The method of artificially coloring granules which comprises coating the granules with pigment and sodium silicate and a substance adapted to inhibit the formation of bloom-producing constituents, predrying said coating by conveying the granules in a relatively shallow bed with circulation of heated air through the depth of the bed whereby said predrying may be completed without substantial agitation of the granules tending to cause color loss by abrasion, and then heating the granules to a temperature sufficient to insolubilize the silicate.

2. The method of artificially coloring granules which comprises coating the granules with pigment, sodium silicate and sodium fluosilicate, predrying said coating by conveying the granules in a relatively shallow bed with circulation of heated air through the depth of the bed whereby said predrying may be completed without substantial agitation of the granules, and then heating the granules to a temperature sufficient to insolubilize the silicate.

3. The method of artificially coloring granules which comprises coating the granules with pigment, sodium silicate and barium fluosilicate, predrying said coating by conveying the granules in a relatively shallow bed with circulation of heated air through the depth of the bed whereby said predrying may be completed without substantial agitation of the granules, and then heating the granules to a temperature sufficient to insolubilize the silicate.

4. The method of artificially coloring granules which comprises coating the granules with pigment, sodium silicate and a substance adapted to inhibit the formation of bloom-producing constituents, conveying the coated granules in a relatively quiescent, shallow bed through a zone wherein heated air is circulated through the depth of the bed for preheating the granules until the coating has set sufficiently to prevent stripping of the coating from the granules when subsequently heated under agitating movement, and then retorting the granules to complete the insolubilization of the silicate.

5. The method of artificially coloring granules which comprises coating the granules with pigment, sodium silicate and a substance adapted to inhibit the formation of bloom-producing constituents in the coating, forming a relatively shallow bed of the coated granules, moving said bed forwardly without substantial disturbance of the granules composing the bed relative to one another, circulating heated air through the bed of granules until the coating has set sufficiently to prevent abrasion of the coating by subsequent agitation of the granules, and then retorting the granules to complete the insolubilization of the silicate.

MARION H. VEAZEY.